D. P. RUSSELL.
REAPER.
No. 173,817.  Patented Feb. 22, 1876.
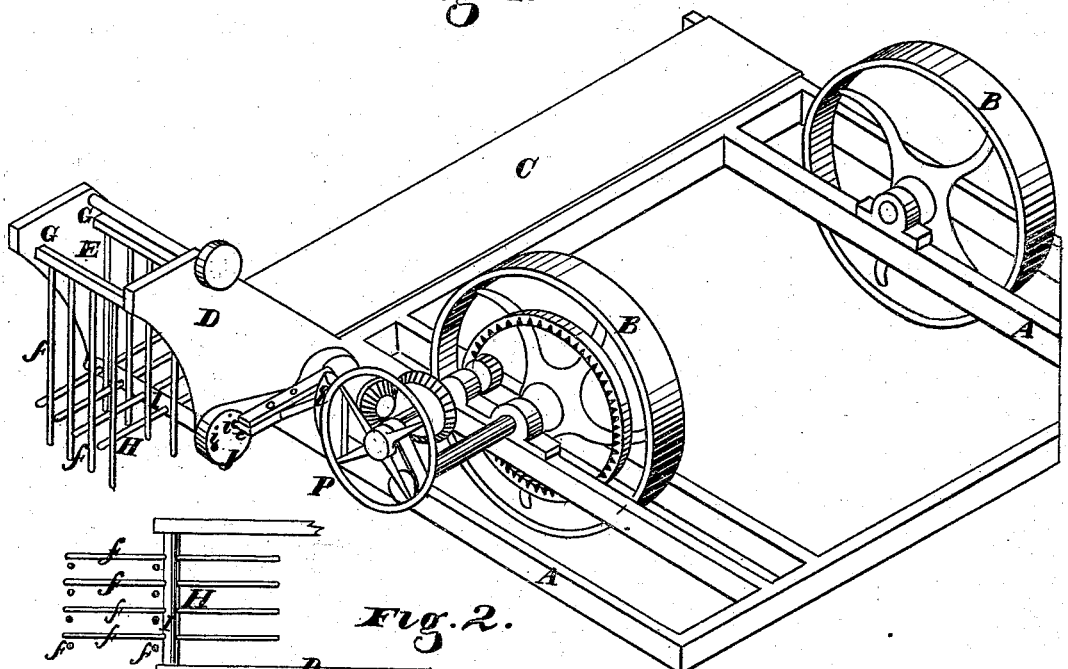
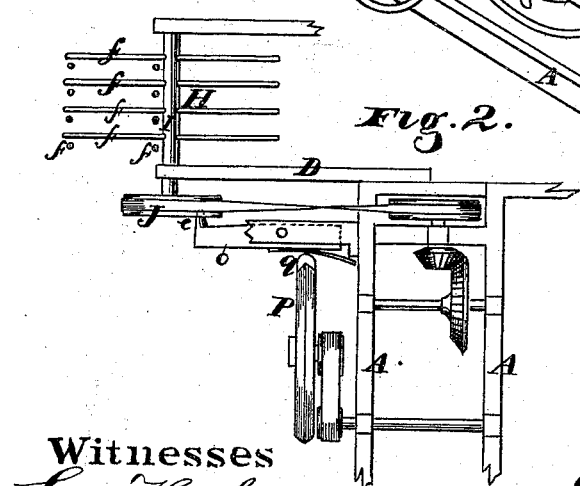
Witnesses
Geo. H. Strong
Jno. L. Bone
Inventor
David P. Russell
by Dewey & Co.
Attys.

UNITED STATES PATENT OFFICE.

DAVID PALMER RUSSELL, OF DIXON, CALIFORNIA.

IMPROVEMENT IN REAPERS.

Specification forming part of Letters Patent No. 173,817, dated February 22, 1876; application filed October 19, 1875.

*To all whom it may concern:*

Be it known, that I, DAVID P. RUSSELL, of Dixon, Solano county, State of California, have invented an Improved Reaper; and I do hereby declare the following description and accompanying drawings are sufficient to enable any person skilled in the art or science to which it most nearly appertains to make and use my said invention or improvement without further invention or experiment.

The object of my invention is to provide that class of harvesting-machines which is known as "header" with an automatic grain receptacle and dropper, so that it can be used as a reaper by collecting the cut grain in the receptacle until a sufficient quantity has accumulated to form a bundle, and then dropping it.

In order to describe my invention so that others will understand its arrangement and operation, reference is had to the accompanying drawing, forming a part of this specification, in which—

Figure 1 is a perspective view of my invention. Fig. 2 is a plan view, showing the bottom H and its connections.

Let A represent the frame of a header, which is mounted upon the two bearing-wheels B B, and propelled by horses attached to a pole in the rear of the machine, in the same manner that a header is propelled. In front of the frame is mounted the draper or carrying-belt C, and sickle, in the usual way. D is the hinged section of the draper, which, in a header, elevates the grain and deposits it in the header-wagon.

With my arrangement, however, it is not necessary to hinge this section, but a simple extension of the draper upon one side of the machine will be sufficient. Neither is it necessary that this extension should be inclined or elevated more than is sufficient to clear the receptacle from the ground, and permit it to drop the bundle. The grain receptacle and dropper can be constructed, applied, and operated in a variety of ways, so as to accomplish the desired object, but for the purpose of this application I have represented the following-described device:

To the outer end of the extension D, and below the end of the draper, I construct an open top box or receptacle, E, the bottom of which can be dropped down so as to permit the grain to drop out upon the ground. In the present instance, I have constructed this receptacle or box and its bottom of metallic rods $f f$. The sides of the receptacle are formed by securing the upper ends of the rods $f f$ in transverse beams G G, which are placed at a short distance apart, so that the rods will stand vertically. The bottom H is composed of parallel rods, which are secured at their middles to a rotary shaft, I, so that the arms which extend to either side of the shaft will form a bottom for the receptacle when brought to the right position, while a half-revolution of the shaft not only drops the grain which has accumulated, but brings the opposite arms or bottom in position. This shaft I has a pulley, J, on its extremity, which is connected by a belt, K, with a pulley, L, on the machine-frame, and this pulley L is driven from the driving-wheel B. The pulley J has two holes, $i\ i$, in its side opposite each other, in which a pin, $e$, on the end of a spring-lever, O, engages. This spring-lever is operated by a trip-wheel, P, which is connected with and driven from the main driving-power. This wheel has a cam-projection, $q$, on one side, which operates against the long arm of the spring-lever O once during each revolution, so as to draw the pin and allow the pulley J to rotate until the pin drops into the opposite hole, thus rotating the bottom H so as to drop the contents of the receptacle and bring into position another bottom, or, if desired, the bottom could be hinged so as to be dropped down by connections with the driving-wheel. By this arrangement I can use an ordinary header as a reaper, and drop the grain in piles suitable for binding into bundles. The draper carries the grain and deposits it on the receptacle and as the machine moves forward the rotation of the trip-wheel P causes the box to drop the bundles at regular intervals.

Having thus described my invention, what I claim, and desire to secure by Letters Patent, is—

1. In combination with the draper-extension support D of an ordinary header, I claim the receptacle E, consisting of the vertical rods $f$, and provided with an automatic hinged or drop bottom, H, substantially as and for the purpose described.

2. In combination with the draper-extention support D, with its open top receptacle E, I claim the bottom H, constructed as described, and arranged to be rotated at intervals by means of the pulley J, with its holes $i$ $i$, spring-lever O, with its pin $e$, and trip-wheel P, with its cam-projection $q$, all connected with and operated from one of the driving-wheels of the machine, substantially as and for the purpose described.

DAVID PALMER RUSSELL.

Witnesses:
JOHN BOHR,
B. ETLINGER.